July 15, 1947. V. E. PRATT ET AL 2,424,052
FILM PROCESSOR
Filed Jan. 18, 1945 5 Sheets-Sheet 2

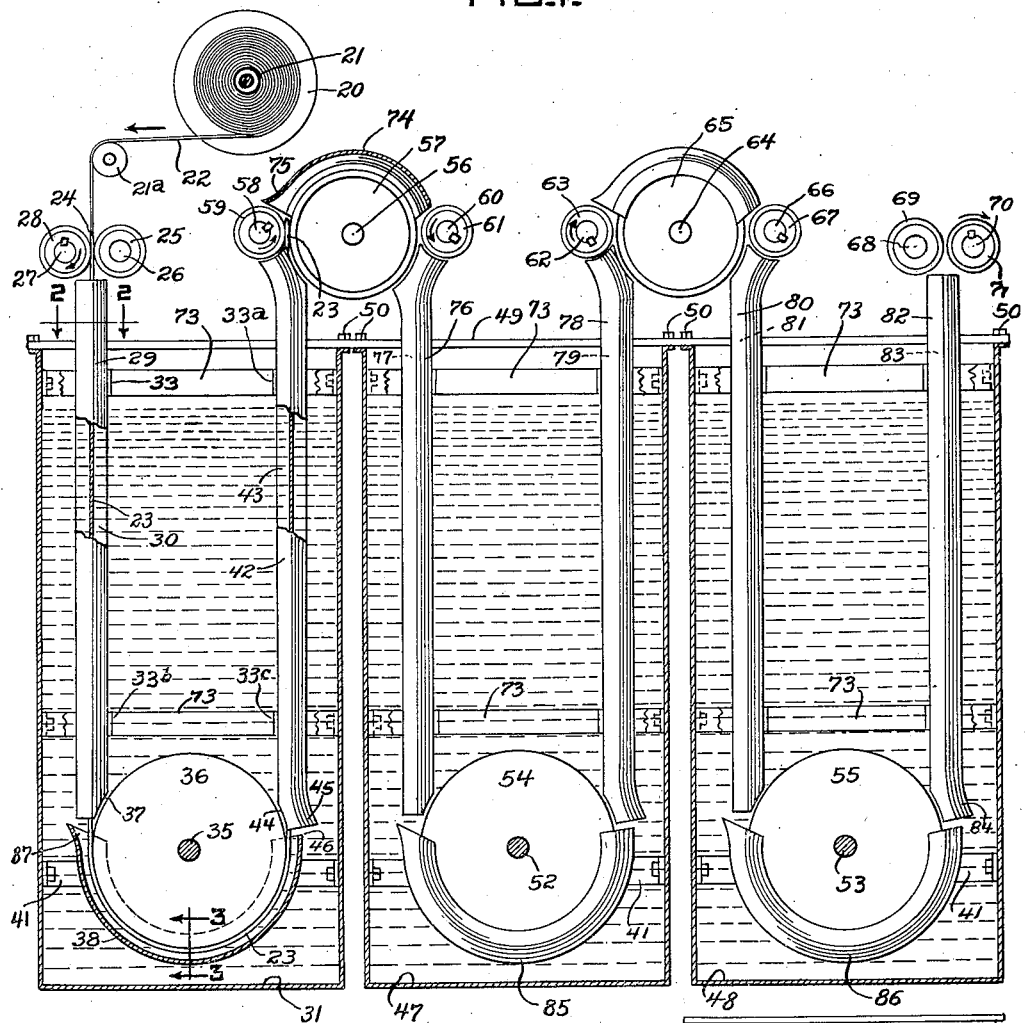

INVENTORS.
VERNEUR E. PRATT
GEORGE F. GRAY
BY
ATTORNEYS.

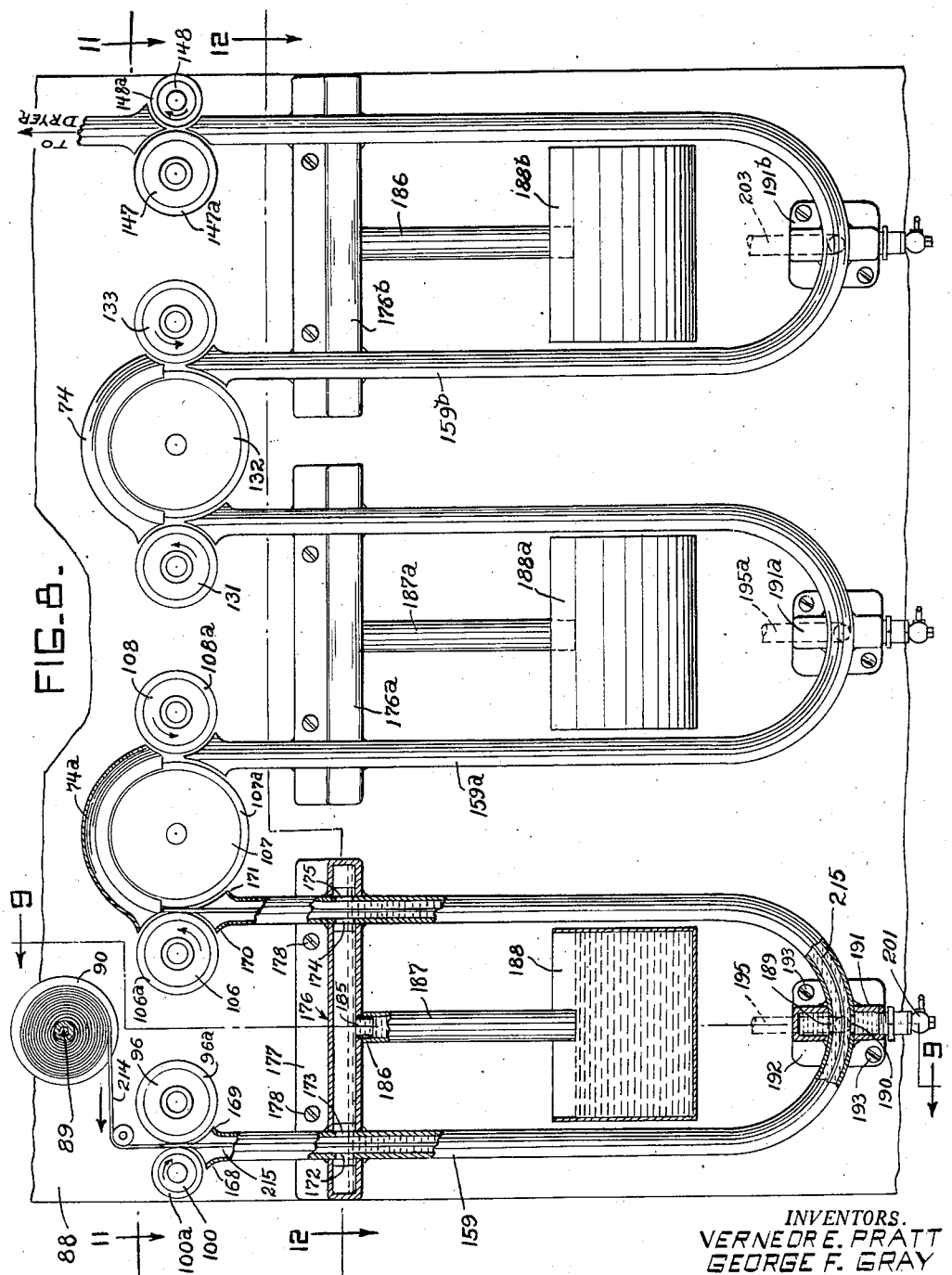

July 15, 1947. V. E. PRATT ET AL 2,424,052
FILM PROCESSOR
Filed Jan. 18, 1945 5 Sheets-Sheet 4
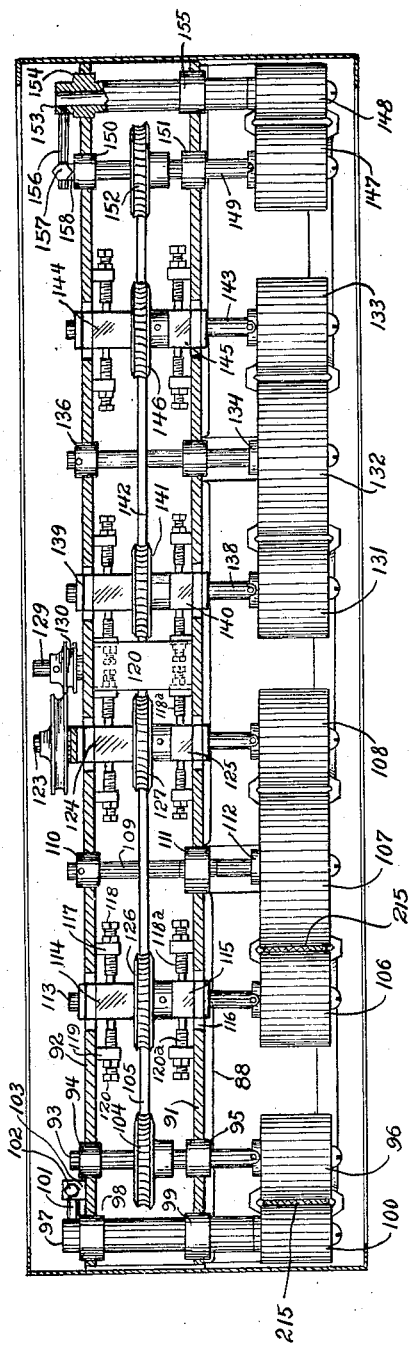
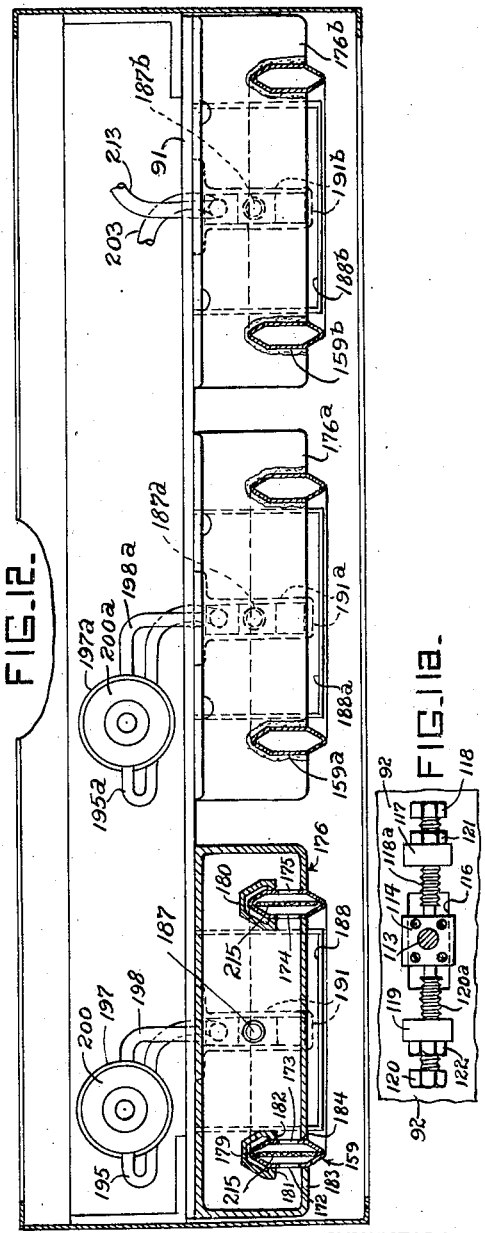
INVENTORS.
VERNEUR E. PRATT
GEORGE F. GRAY
BY
ATTORNEYS

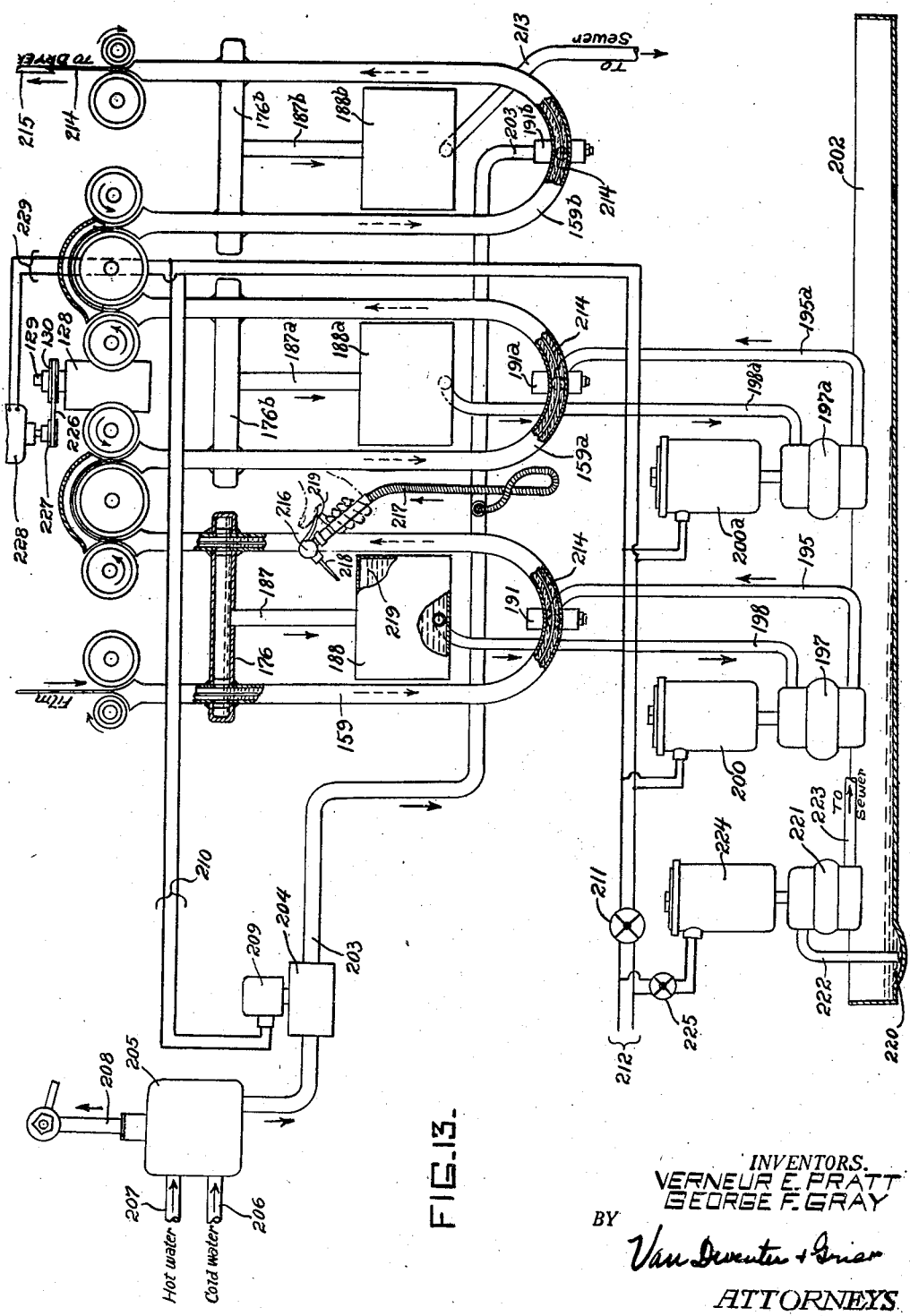

Patented July 15, 1947

2,424,052

UNITED STATES PATENT OFFICE 2,424,052

FILM PROCESSOR

Verneur E. Pratt and George F. Gray,
Norwalk, Conn.

Application January 18, 1945, Serial No. 573,433

15 Claims. (Cl. 95—94)

This invention relates to improvements in film processors, wherein the film to be processed is moved through a series of containers of processing fluids, and is directed more particularly to the elimination of the usual "festoons" of leading film.

The invention may be applied to the type of film processor described and claimed in our co-pending application Serial Number 474,316, filed February 1, 1943, now Patent Number 2,401,185, dated May 28, 1946, or it may be applied to the type of processor described and claimed in our co-pending application Serial Number 507,938, filed October 28, 1943.

In the first mentioned application is shown a continuous film processor in which the film runs in tubes or guides and is propelled therethrough by means of cooperative rollers. The tubes or guides are submerged in tanks containing the proper chemical solutions.

The second mentioned application relates to a closed track guide through which the film is propelled by cooperative rollers. These guides have the proper chemical solutions circulated therethrough and, therefore, no tanks are required.

In both of the above referred to applications the film passes between the cooperative rollers and is guided along predetermined paths by the guides referred to so that, as the leading end of the film traverses each tube or guide, it is engaged by the next set of cooperative rollers and is guided through to the next tube or guide.

The present invention may also be applied to any standard type of motion picture film processor using rollers around which the film flows in its path from one tank of solution on to the succeeding tank. According to this invention the use of sprockets to advance the film through the processor is eliminated and, instead of this, we employ rubber rollers between which the film is pulled. The rollers are so spaced that it is impossible for the film to be actually driven by the rollers. A leader is attached to the front end of the film and this leader is substantially thicker than the film and is actually driven by the roller, thereby pulling the film through the processor.

Most continuous film processors of the prior art employ a long leader which is threaded or "festooned" through the machine. This is usually done by hoisting the mechanism up out of the processing tanks with a block and tackle or the like, and after the leader is threaded or "festooned" over all of the rollers, the mechanism is then lowered into the tanks. The exposed film is usually spliced to the leader and then the power is turned on so that the leader is first driven by the rollers and then the film is driven by the rollers. In order to avoid having to re-thread the leader over the rollers, the leader may be attached to the end of the exposed film so that, as it passes through the mechanism, it in turn pulls the leader in. Then the film may be cut off from the leader leaving the latter festooned over the rollers and ready to have the next exposed film attached thereto.

The new and improved processor described herein eliminates such steps as those described in the above paragraph and it may therefore be termed an automatic self-threading processor.

A further object of the invention is the provision of a processor which will process films whether they have perforations formed therein or not.

Yet another object of the invention is the provision of a processor adapted not only to handle the average roll length, but also short films which may be no longer than the length of the path defined by the film guides through the processing solution.

Other objects and advantages of the invention will be obvious to those skilled in the art upon a study of the accompanying drawings and the following specification.

Referring to the drawings, which are given by way of illustration:

Figure 1 is an elevation partly in section of apparatus employing tanks in which the several solutions are contained, and which include guiding means for the film;

Figure 2 is a sectional view taken along the line 2—2 of Figure 1;

Figure 3 is a sectional view taken along the line 3—3 of Figure 1;

Figure 4 is an elevation partly broken away showing one bearing for the lower idler roller shaft and also showing the drain plug for drawing the solution from the tank.

Figure 5:
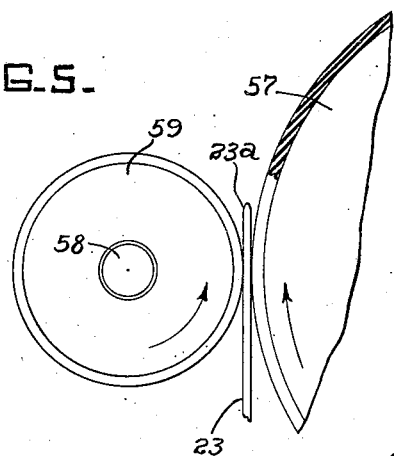
Figure 5 is a fragmentary view showing the relation of the drive roller to the driven roller and showing the end of the thick leader as it enters between and is driven by said rollers.
Figure 6:
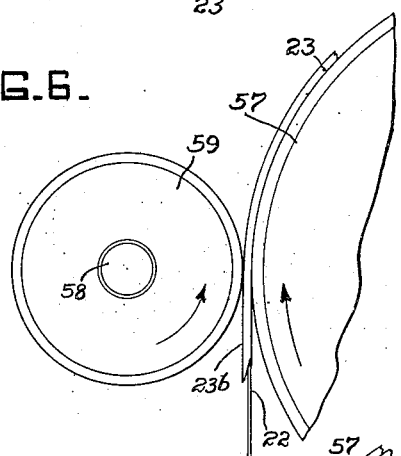
Figure 6 is a view similar to Figure 5 except that the thick leader has almost all been driven through the rollers, and showing the film secured to the lower end of the leader.
Figure 7:
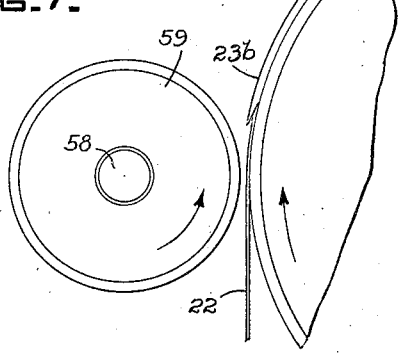
Figure 10:
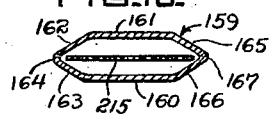
Figure 9:
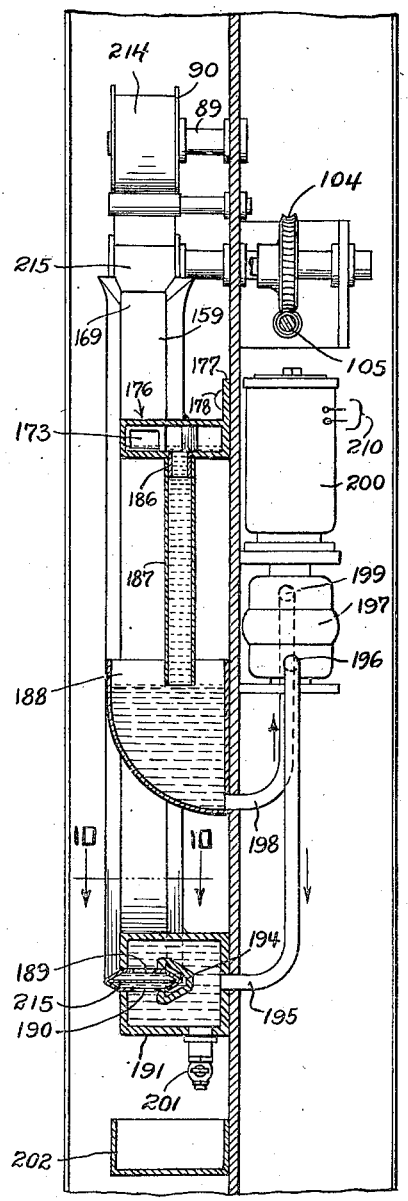

Figure 7 is similar to Figures 5 and 6 except that in this view the thick leader has passed through the two rollers and the film is between them. Since the spacing between the rollers is substantially greater than the thickness of the film, the film is not driven by the rollers, and by this time the thick leader is being engaged by rollers further on in the series and therefore the film is actually pulled over the large roller, which is a free roller;

Figure 8 is an elevation partly in section of a modification of the arrangement shown in Figure 1 and employing closed conduits through which the film passes and through which the processing fluids are circulated at a high rate of speed;

Figure 9 is a sectional elevation taken along the lines 9—9 of Figure 8;

Figure 10 is a sectional view taken along the line 10—10 of Figure 9;

Figure 11 is a plan view of the rollers and driving means connected thereto;

Figure 11a is a detail view showing one method of adjusting the center distance between a given shaft and a fixed shaft;

Figure 12 is a plan view partly in section taken along the line 12—12 of Figure 8; and Figure 13 is a diagrammatic view showing the circulating mechanism, the mixing valve for mixing hot and cold water to a predetermined temperature for the washing bath, and other details of control.

Referring first to Figure 1, a reel 20 carried on a support 21 carries exposed film 22. Attached to the film 22 is a leader 23. The leader 23 is attached to the film 22 at the point 24. A free roller 25 is mounted on a suitable shaft 26. Spaced apart from the shaft 26 is a driven shaft 27 which has a drive roller 28 keyed thereto. The space between the drive roller 28 and the free roller 25 is greater than the thickness of the film 22. The thickness of the leader 23 is greater than the spacing between the rollers 25 and 28. Therefore, the drive roller 28 does drive and propel the leader downwardly between the oppositely disposed V-shaped channels 29 and 30. The relation of these V-shaped guides may be seen in Figure 2.

The channels 29 and 30 extend downwardly and are suitably supported in a processing tank 31 by means of brackets 32 and 33. A pair of aligned bearings, one of which is designated by the numeral 34 in Figure 4, rotatably support a shaft 35. Mounted on the shaft 35 is a free roller 36. The roller 36 is tangent to a plane passing through the centers or apexes of the V-shaped channels 29 and 30, and these channels are beveled at 37 to clear the free roller 36.

Partially embracing the roller 36 is an arcuate channel 38, the edges 39 and 40 of which overlap the ends of the roller 36 as may be seen in Figure 3. The arcuate channel is suitably supported in the tank 31 by brackets, one of them being designated by the numeral 41.

A second pair of opposed V-shaped channels 42 and 43 is supported in the tank 31 in such a manner that a plane extending through their apexes is tangent to the opposite edge of the roller 36. These channels are cut away at 44 to clear the roller and are flared at 45 so as to extend beyond the end 46 of the arcuate channel 38.

Adjacent to the tank 31 is a second tank 47, and a third tank 48 is adjacent to the tank 47. These tanks may, for convenience, be secured together by means of crossbars, one of which is shown at 49, secured to the flanged upper ends of the tanks by means of bolts 50. Each tank may be provided with a suitable drain plug, such as that shown at 51 in Figure 4. The tanks 47 and 48 also carry aligned bearings like that shown at 34 in Figure 4 for supporting, respectively, the free roller shafts 52 and 53. A free roller 54 is mounted on the shaft 52 and a like free roller 55 is mounted on the shaft 53.

Above the tank and spaced apart from the rollers 25 and 28 is a shaft 56 carrying a free roller 57. To the left of the free roller 57 is a shaft 58 which carries a drive roller 59. The drive roller 59 is spaced apart from the free roller 57 a distance greater than the thickness of the film 22 and less than the thickness of the leader 23.

To the right of the free roller 57 is a drive shaft 60 which carries a drive roller 61. The drive roller 61 is spaced apart from the free roller 57 a distance greater than the thickness of the film 22 and less than the thickness of the leader 23. Laterally spaced apart from the roller 61 is a drive shaft 62 carrying a roller 63. A shaft 64 spaced apart from the shaft 62 carries a free roller 65, and a drive shaft 66 spaced apart from the shaft 64 carries a roller 67. The spacing between the free roller 65 and the drive rollers 63 and 67 is greater than the thickness of the film 22 and less than the thickness of the leader 23.

Spaced apart from the shaft 66 is a drive shaft 68 which carries a drive roller 69, and spaced apart from the shaft 68 is a shaft 70 which carries a free roller 71. The space between is less than the thickness of the film 22. Since all of the drive rollers and free rollers along the tops of the tanks are provided with treads formed of rubber or the like, the rollers 69 and 71 will propel both the thick leader and the (thinner) film, and will further act as a squeegee for removing excess liquid (water) from the surface of the film.

Referring again to the tank 31, the V-shaped channels 42 and 43 are supported by brackets 32a and 33a secured to cross-members 72 and 73. The channels 29 and 30 are supported near their lower ends by brackets 32b and 33b secured to cross members 72a and 73a mounted in the tank 31. The channels 42 and 43 are also supported near their lower ends by brackets 32c and 33c secured respectively to the cross members 72a and 73a.

An arcuate channel member 74 partially embraces the free roller 57 and is held in spaced relation thereto by supports not shown. The left end of the arcuate channel 74 (as seen in Figure 1) has a flare 75 formed thereon.

The tank 47 has opposed V-shaped channels 76 and 77 supported therein in such a manner that a plane extending through the apexes thereof is substantially tangent to the free roller 57 at the upper end and the free roller 54 at the lower end. The upper ends of these channels are flared to the right and are cut away to clear the free roller 57 and the drive roller 61. These channels on their lower ends are beveled to clear the roller 54.

Spaced apart from the channels 76 and 77 in the tank 47 is a second pair of opposed V-shaped channels 78 and 79 which are duplicates of the channel members 42 and 43, the upper ends of these channels being cut away to clear the drive roller 63 and the free roller 65.

Supported in the tank 48 is a pair of opposed V-shaped channels 80 and 81 which are duplicates of the channels 76 and 77. A plane extending through the apexes of these channels is substantially tangent to the roller 65 at the upper end and roller 55 at the lower end. In the tank 48, supported in spaced relation to the channels 80 and 81 is a pair of channels 82 and 83 which are identical with the channels 29 and 30 except that they are flared to the left on their lower ends, one of the flares being designated by the numeral 84.

Partially embracing the free roller 54 in the tank 47 is an arcuate channel 85 which is substantially a duplicate of the arcuate channel 38. Like the channel 38, the sides of the channel 85 overlap the ends of the roller 54.

The tank 48 also carries an arcuate channel member 86 which is also a duplicate of the channel 38. All three of these channels are provided with flares such as that shown at 87 on the channel 38, the purposes of which will be presently described.

It will be understood that the arrangement shown in Figures 1 to 4, inclusive, is more or less diagrammatic and that suitable supports are provided for the reel shaft 21, the roller 21a, and suitable bearings are provided for the shafts 27, 26, 58, 56, 60, 62, 64, 66, 68 and 70, and suitable means is provided for driving the shafts carrying the driven rollers 28, 59, 61, 63, 67, and 69 in the directions indicated by the arrows.

*Operation*

The tanks 31 and 37 are filled to the proper levels with processing fluids to effect the desired results. For example, the tank 31 may contain a developer-fixer, the tank 47 may contain a stopping-bath and the tank 48 may be fitted with water and may be provided with an overflow and connected to a source of supply, so that fresh water is running in all of the time and spent water is overflowing. It is obvious that, if desired, additional tanks may be included in the combination so that the setup could be a first tank containing developer, a second tank containing water or any other suitable stop for the developer, a third tank which may contain a fixing bath and a fourth tank which may be used for washing out the fixer.

A reel 20 of exposed film 22 has a leader 23 cemented thereto at 24. The leader 23 is substantially thicker than the film 22, and since the spacing of the rollers 25 and 28 is greater than the thickness of the film and less than the thickness of the leader the end of the leader may be led in between the rollers with the result that the rollers drive the leader. As the end of the leader moves downwardly it leaves the opposed channels 29 and 30 and enters the flared end 87 of the arcuate channel 38 and is thereby guided around between the inner surface of the channel 38 and the perimeter of the roller 36. When the end of the leader leaves the right end of the channel 38 it is guided into the opposed channels 42 and 43 by the flared ends 45 and it passes up the opposed channels 42 and 43 and enters between the drive roller 59 and the free roller 57. The leader is of such length that by the time the free end is drivingly engaged between the rollers 59 and 57, the other end which is secured to the film is just leaving the rollers 25 and 28.

As the roller 59 continues to drive the leader 23 upwardly the end encounters and is guided by the arcuate channel 74 toward the drive roller 61 so that the end of the leader passes between the drive roller 61 and the free roller 57 and is directed downwardly between the channels 76 and 77. As the end of the leader leaves the lower ends of the channels 76 and 77 it enters the space between the arcuate channel 85 and the perimeter of the roller 54 and is guided therearound and upwardly between the channel members 78 and 79. As soon as the rollers 63 and 65 drivingly engage the ends of the leader 23 the opposite end, which is attached to the film 22 is just leaving the rollers 61 and 57. The leader progresses through the machine and is successively driven by the rollers 63, 67 and 69 and thereby advanced through the channels 80, 81 and 82, 83.

Obviously, as the leader 23 is advanced through the channels and drive rollers in the manner above described the film 22, which is attached to the trailing end of the leader is pulled over the free rollers 25, 36, 57, 54, 65 and 55 in the order named, and in being pulled over these rollers, it successively passes through and is processed by the fluids in the several tanks.

Any suitable means may be provided for engaging the leader 23 after it leaves the rollers 69 and 71 and propelling it and the film 22 attached thereto through a dryer, and the leader and film leaving the dryer may be wound on a suitable reel.

From the above description it will be seen that in order to use the device shown and described in Figures 1 to 4, inclusive, it is merely necessary to attach a piece of thick leader 23 to the free end of an exposed film 22, then place the reel 20 containing the exposed film on the reel support 21 and guide the leader 23 over the roller 21a and insert the free end of the leader between the rollers 28 and 25 (the mechanism having been started up). The mechanism automatically guides and threads the leader through the series of rollers in the manner described above, and results in pulling the film 22 over those of the rollers which are free, thereby automatically processing and washing the film which may be then led to a dryer. It will also be noted that the rollers 69 and 71, in addition to driving the film, also squeegee the washing water from the surfaces thereof.

In Figures 5, 6 and 7 we show the relative positions of the rollers 57 and 59. It will be noted that the free end 23a of the leader 23 has entered between and is driven by these two rollers due to the fact that the space between the rollers is less than the thickness of the leader. In Figure 6 the trailing end 23b of the leader, which has the leading end of the film 22 secured thereto, has almost completely passed between the rollers 59 and 57, and in Figure 7 it will be noted that the leader has passed out from between the rollers and that the film 22 passes between the rollers 57 and 59. Since the film is thinner than the space between the rollers, the film is not driven but, instead, is in contact with the roller 57 which at that time acts as a free roller.

In Figures 8 to 12, inclusive, is shown a modification of the arrangement described above. A supporting wall 88 carries a reel shaft 89 adapted to support a reel 90 containing exposed film. Back of the wall 88, as may be seen in Figure 11, is a pair of spaced parallel supporting members 91 and 92. A shaft 93 is journalled in a bushing 94 in the support 92 and a bushing 95 in the support 91. The shaft 93 carries a drive roller 96. A shaft 97 carries enlarged eccentric portions 98 and 99 which are respectively journalled in the supports 92 and 91. The shaft 97 has a portion (not shown) of reduced diameter upon which is journalled a free roller 100. Extending laterally from the shaft 97 is an arm 101 which is engaged by a screw 102 which extends through a fixed boss 103 on the support 94. By means of the screw 102 the space between the drive roller 96 and the free roller 100 may be adjusted. This space, as was the case in the embodiment previously described, is greater than the thickness of the film and less than the thickness of the leader.

The shaft 93 has secured thereto a worm gear 104 which meshes with a worm carried on the wormshaft 105.

Spaced apart from the set of rollers 96, 100 is a second set of rollers comprised of a drive roller 106, a free roller 107 and a drive roller 108. The free roller 107 is mounted on a shaft 109 which is supported by a bushing 110 in the support 92 and a bushing 111 in the support 91. The free roller 107 forms a working fit against the shoulder 112. The drive roller 106 is keyed to a shaft 113 which is journalled in bushings 114 and 115.

Referring now to Figure 11ª which shows the details of the bushing 114, it will be noted that the bushing 114 is rectangular and forms a working fit in an elongated rectangular slot 116. A boss 117 extends outwardly from the support 92 and is threadedly engaged by a cap screw 118. A second boss 119 is also carried on the support 92 and is threadedly engaged by a cap screw 120. The cap screws bear against the bushing 114 and may be adjusted longitudinally in the hole 116 by backing off on one cap screw and tightening up on the other. When the desired adjustment is obtained, it may be retained by tightening the locknut 121 on the cap screw 118 and the locknut 122 on the cap screw 120. The bushing 115 is likewise mounted in a rectangular hole formed in the support 91 and may be adjusted by means of cap screws 118ª and 120ª.

The drive roller 108 is keyed to a shaft 123 which is journalled in rectangular bushings 124 and 125. The bushing 124 is adjustable like the bushing 114 on the support 92. The bushing 125 is adjustable like the bushing 115 on the support 91. A worm gear 126 is keyed to the shaft 113 and meshes with a worm on the wormshaft 105. A like worm gear 127 is keyed to the shaft 123 and meshes with a worm on the shaft 105. The shaft 105 extends from the reduction gear box 128. A driven shaft 129 extends from the gear box and carries a grooved pulley 130 which may be driven in any suitable manner.

In calibrating the device the drive roller 106 may be adjusted toward or away from the free roller 107 so that the space therebetween is less than the thickness of the film and greater than the thickness of the leader. The drive roller 108 may be adjusted toward or away from the free roller 107 in the same manner as described for the shaft 113 so that the space between the roller 107 and 108 is less than the thickness of the film and greater than the thickness of the leader.

Spaced apart from the set of rollers just described is a set comprising a drive roller 131, a free roller 132 and a drive roller 133. The free roller is journalled against a shoulder 134 on a shaft 135 mounted in bushings 136 and 137 in the supports 92 and 91 respectively. The drive roller 131 is keyed to a shaft 138 which is mounted in rectangular bushings 139 and 140 adjustably carried in the supports 92 and 91 respectively. A worm gear 141 is keyed to the shaft 138 and meshes with a worm carried on the wormshaft 142 which extends to the right from the gear reduction box 128. The drive roller 133 is keyed to a shaft 143 mounted in adjustable bushings 144 and 145 and carrying a worm gear 146 which meshes with a worm on the wormshaft 142. The drive rollers 131 and 133 may be adjusted toward or away from the free roller 132. It will be noted that in adjusting any of the shafts 113, 123, 138 and 143, the adjustment is carried out along lines parallel to the axes of the wormshafts 105 and 142, and therefore, the pitch relation between the worm gears carried by these shafts and the worms with which they mesh is not changed.

Spaced apart from the rollers 131, 132 and 133 is a set of rollers comprised of a drive roller 147 and a free roller 148. The drive roller 147 is keyed to a shaft 149 which is journalled in bushings 150 and 151 mounted in the supports 92 and 91 respectively and has keyed thereto a worm gear 152 which meshes with a worm carried on the wormshaft 142. A shaft 153 carries eccentric portions 154 and 155 mounted in the supports 92 and 91 respectively and also has a portion of reduced diameter (not shown) upon which the free roller 148 is journalled. Secured to the shaft 153 is an arm 156 which is engaged by a screw 157 mounted in a stud 158 carried on the support 92. By means of the screw 157 the spacing between the rollers 147 and 148 may be adjusted.

Since these rollers are the last in the series, they are adjusted so that they will drive the film. All of the rollers, both the drive rollers and the free rollers, have rims formed of rubber or the like. For example, referring to Figure 8, it will be noted that the free roller 100 is provided with a rubber ring 100ª. The drive roller 96 is provided with a rim 96ª et cetera.

A U-shaped conduit 159, the cross section of which may be seen in Figure 10, consists of parallel sides 160 and 161 joined by angular portions 162 and 163 on one side forming an apex 164. Similar sides 165 and 166 join the sides 160 and 161 and meet at an apex 167. The film 22 normally clears the conduit 159 and the likely points of contact with the conduit are on the extreme edges.

One leg of the conduit 159 has flares 168 and 169 formed thereon. These flares are oppositely disposed, 168 being adjacent to the roller 100 and 169 being adjacent to the roller 96.

The other leg of the conduit is similarly flared at 170 and 171.

One leg of the conduit has aligned holes 172 and 173 formed therein and in alignment with these holes in the other leg are formed aligned holes 174 and 175. A hollow casing 176 extends laterally from the wall 88 and has an upstanding flange 177 which is secured to said wall by means of screws 178. Extending vertically within the hollow casing 176 are webs 179 and 180 (Fig. 12). These webs are generally V-shaped and the forward edges extend toward each other to engage the conduit as will be presently described. For example, the web 179 has forward edges 181 and 182 extending toward each other and these edges are machined off so that the space therebetween is substantially equal to the thickness of the conduit 159 (this is the distance from the outer face of the surface 160 to the outer face of the surface 161, Figure 10). The front wall 183 of the casing 176 has a corresponding slot 184 formed therein and the top and bottom walls of the casing are shaped to accommodate one leg of the conduit 159. The web 180 is similar to the web 179 and the walls of the casing are shaped to accommodate the other leg of conduit 159. With the conduit positioned in the apertures in the casing 176 and with the apexes clearing the webs 179 and 180, the conduit is soldered or brazed to the casing to form a fluid-tight joint.

The purpose of the casing 176 is to receive the processing fluid (which is forced through the conduit by means of a pump to be presently described) as the fluid is ejected through the openings 172, 173, 174 and 175. In co-pending application Serial Number 507,938, pipe fittings are shown connected to the U-shaped conduit, and the present arrangement is a distinct improvement due to the fact that it eliminates the difficulties encountered in using the fittings.

The casing 176 has a hole 185 formed in the bottom wall thereof and this hole is fitted with a bushing 186 to which is attached a short pipe 187, which extends into the open end of a tank 188 secured to the wall 88. Thus, fluid passing from the openings 172 to 175, inclusive, and into the casing 176 flows out through the hole 185 and via the pipe 187, and is delivered to the tank 188. At the bottom the U-shaped conduit 159 has aligned holes 189 and 190 formed therein. A hollow casing 191 has a flange 192 which is secured to the wall 88 by means of screws 193. The casing 191, as may be seen in Figure 9, has formed therein a lateral web 194 similar to the webs 179 and 180 above described. The casing 191 is slotted inwardly from the front wall in alignment with the web to accommodate the conduit at the bottom of the U. The conduit is positioned in the hollow casing 191 as shown and is soldered or brazed thereto to form a fluid-tight joint. A fitting or pipe 195 has its lower end in communication with the interior of the casing 191 and its upper end is connected to the outlet 196 of a pump 197. The pipe 198 has its lower end in communication with the interior of the tank 188 and its upper end is connected to the inlet 199 of the pump 197. The pump is directly connected to an electric motor 200. When the motor is turned on fluid is drawn from the tank 188 via the pipe 198 to the inlet of the pump and thence, via the outlet 196 and the pipe 195, fluid is delivered to the hollow casing 191. The fluid then passes via the aligned holes 189 and 190 into the U-shaped conduit 159 where it divides, and part of it passes up the left leg, as seen in Figure 8, then outwardly from the conduit via the holes 172 and 173 into the hollow casing 176. Part of the fluid also passes up the right leg and out via the holes 174 and 175 into the hollow casing 176. The fluid flows from the casing via the pipe 187 and returns to the tank 188.

The fluid entering the conduits via the holes 189 and 190 has substantial velocity, and therefore, it washes off any deposits on the surface of the film due to the processing fluid. This is particularly important in cases where fixer-developers are used in our apparatus. The action of the fixer-developer results in a deposit on the surface of the emulsion, which deposit shields the emulsion from free action by the solution. However, the velocity of the fluid up both legs of the conduit washes off the coating or deposit, thereby leaving the surface of the emulsion open to the continued action of the fixer-developer.

The hollow casing 191 is provided with a suitable drain cock 201 by means of which the entire system may be drained into a container or trough 202 in the bottom of the machine.

A second U-shaped conduit 159ª is identical with the conduit 159 and has associated therewith a hollow casing 176ª and a discharge pipe 187ª discharging into a tank 188ª.

At the bottom of the U is a hollow casing 191ª like the hollow casing 191. A pump 197ª similar to the pump 197 is provided for drawing liquid from the tank 188ª and delivering it to the hollow casing 191ª.

A third U-shaped conduit 159ᵇ is identical with the conduit 159 and has associated therewith a hollow casing 176ᵇ and a discharge pipe 187ᵇ discharging into a tank 188ᵇ.

At the bottom of the U is a hollow casing 191ᵇ like the hollow casing 191. A pipe 203 has one end connected to the hollow casing 191ᵇ (see also Figure 13) and the other end of this pipe is connected to a solenoid valve 204 which is in turn connected through a mixing valve 205 for mixing hot and cold water together to deliver water at a predetermined temperature. A pipe 206 leads from the mixing valve to a source of cold water under pressure and a pipe 207 is connected to the mixing valve 205 and leads to a source of hot water under pressure.

The mixing valve 205 is provided with a thermostatic control 208 which automatically controls the temperature of the water delivered by the pipe 203.

The valve 204 includes a solenoid 209 which is connected via a pair of wires 210 and a switch 211 to a source of current 212.

The switch 211, when turned on, supplies energy to both the motor 200 and the motor 200ª and to the solenoid 209 on the valve 204. Thus, when the machine is turned on, the pump 197 driven by the motor 200 circulates fluid in the U-shaped conduit 159, the pump 197ª, driven by the motor 200ª, circulates fluid in the U-shaped conduit 159ª and the solenoid valve 204 is opened and delivers warm water to the U-shaped conduit 159ᵇ.

It has been described above that the processing fluid circulated through the U-shaped conduits 159 and 159ª returns to the pumps and is recirculated. However, the washing water which is delivered via the pipe 203 to the U-shaped conduit 159ᵇ overflows into the hollow casing 176ᵇ, passes down the pipe 187ᵇ into the tank 188ᵇ and thence passes to the sewer or drain via a pipe 213, the upper end of which is connected to the bottom of the tank 188ᵇ.

From the above description it will be clearly understood that the reel 90 of exposed film 214 may be positioned on the stud 89, said film having had a thick leader 215 secured to its outer end, and the end of the leader may be inserted between the rollers 96 and 100, and this leader will be driven by the rollers until the latter encounter the film. Since the space between the rollers 96 and 100 is greater than the thickness of the film, the latter will not be driven by the rollers. However, by the time the end of the film encounters the rollers 96 and 100, the end of the leader is between and engaged by the rollers 106 and 107, with the result that the rollers 106 and 107 drive the leader and pull the film through the U-shaped conduit 159.

The leader 215, as it passes between the rollers 106 and 107, is deflected by the arcuate channel member 74ª and is guided between the rollers 107 and 108 and thence downwardly in the left leg of the conduit 159ª. When the attached end of the leader 215 passes out from between the rollers 106 and 107 the film is pulled thereby over the roller 107, due to the fact that the space between the roller 106 and the roller 107 is greater than the thickness of the film. As the leader passes around the U-shaped conduit 159ª and is engaged by the rollers 131 and 132, its attached end passes out from between the rollers 107 and 108, and therefore the roller 107, which is a free roller, acts as a pulley or roller over which the film is pulled.

The leading, or free, end of the leader 215 is guided by a second arcuate channel member 74ᵇ and passes between the roller 132 and the roller 133 and thence down the left leg of the conduit 159b. As the leader passes up the right leg of the conduit, it is engaged by rollers 147 and 148.

As was pointed out hereinbefore, the spacing between the rollers 147 and 148 is less than the thickness of the film, and since these rollers are provided with rims 147a and 148a of rubber or other yieldable material, they are able to effectively propel both the thick leader and the thinner film, and it has also been pointed out that these rollers squeegee the washing water, or whatever fluid they encounter on the film, as it leaves the U-shaped conduit 159b, and they drive not only the leader but the entire length of the film and thereby pull the same over the series of rollers 96, 197 and 132. The film, after the same has been processed and squeegeed as aforesaid, is led to a suitable dryer which forms no part of the present invention.

Referring again to Figure 13, applicants provide a drain pan or trough 202 in the bottom of the machine. This drain pan or trough is provided for catching any fluids which spill or which are dumped from the system. Applicants also provide a dirigible nozzle 216 which is connected by means of a flexible hose 217 to the pipe 203. The nozzle may have a plunger valve 218 so that the operator may turn the spray nozzle off or on at will for washing down the interior of the machine or flushing out and draining the several tanks and conduits in the machine.

Another important use of the nozzle 216 is in connection with mixing the processing solutions. For example, the powdered, pulverized and/or liquid chemicals may be placed in the bottom of the proper tank 188, then the operator may, by means of the nozzle 216, fill the tank until the liquid level reaches the line indicated by the numeral 219, and thereby add the proper amount of water for the charge of chemicals. The charge of chemicals may be proportioned so that one charge will completely process a roll of film, following which the operator may, by means of the drain cock 201, empty the tank of solution. This is preferably done with the pumps operating so that when the system is drained additional water may be added to the tanks, and this will be pumped through the pump and out by the drain cocks and thereby flush each section of the machine.

The drain pan has a sump 220 formed therein preferably adjacent to one end thereof. A pump 221 has its inlet connected to one end of a pipe 222, the other end of which extends into the sump. The outlet of the pump is connected to a pipe 223 which leads to the sewer. The pump 221 is directly connected to a motor 224, and this motor is connected via switch 225 to the source 212, so that any time it is desired to remove fluid from the drain pan 202, it is only necessary to turn the switch 225 and set the pump 221 into operation.

The pulley 130 on the gear reduction 128 is connected via a belt 226 to a pulley 227 which is secured to the shaft of a driving motor 228. The driving motor 228 is connected via a pair of wires 229 to the wires 210 so that the switch 211 may, in addition to controlling the solenoid 209 and the motors driving the pumps 197, 197a, also effect the driving of the series of driving rollers driven by the worm shafts 105 and 142.

Although we have herein shown and described two embodiments of our inventive concept, it is obvious that many changes in the arrangement herein shown and described may be made without departing from the spirit of the invention as set forth in the following claims.

What is claimed is:

1. In devices for processing film wherein said film is passed over a series of drive and free rollers with guiding means associated therewith, the method of propelling said film over said rollers which consists of attaching a leader to the end of said film, said leader being substantially thicker than the film, adjusting said rollers relative to each other so that the spacing between the drive rollers and the free rollers is greater than the thickness of the film and less than the thickness of the leader, and inserting the free end of the leader between the first pair of rollers in said series, and actuating said drive rollers to effect the driving of said leader and the pulling of said film over said free rollers.

2. In devices for processing film, the method of propelling the film therethrough which consists of attaching a leader to the end of the film, said leader being substantially thicker than the film, and inserting the free end of said leader between a first pair of cooperating drive and free rollers, the space between said rollers having been previously adjusted to a distance greater than the thickness of the film and less than the thickness of the leader, actuating said drive rollers to effect the driving of said leader and consequently the pulling of said film over the free rollers of said series.

3. In a device for processing film to which a leader thicker than said film is attached, a series of free rollers flanked by drive rollers, said drive rollers being spaced from said free rollers a predetermined distance, said predetermined distance being greater than the thickness of the film and less than the thickness of a leader which is attached to the film and inserted between a cooperative drive and free roller in said series, and means for driving said drive rollers thereby causing said leader to be driven by said cooperative rollers and the film to be pulled over the free rollers without contacting said drive rollers.

4. In a device for processing film, a series of free rollers flanked by drive rollers, said rollers being disposed in several groups, a second series of free rollers spaced apart from said groups and lying on planes extending between said groups, film guide means disposed between and substantially tangent to the peripheries of the free rollers in both said series, arcuate guide means associated with all of the free rollers in said second series and at least some of the free rollers in said first series, means for setting said drive rollers apart from said free rollers of said first series a distance greater than the thickness of the film and less than the thickness of a thick leader which is attached to the film, and means for driving said drive rollers whereby said leader may be inserted between and driven by a cooperative drive and free roller in said series, be guided around a roller in said second series and up said guide means to enter between a second cooperative drive and free roller, thereby pulling said film over both said last mentioned free rollers without contacting said drive rollers.

5. In a device for processing film, an array comprised of free rollers spaced apart from each other laterally and a free roller spaced apart vertically from and having its axis lying on a plane passing between said first mentioned rollers, a drive roller associated with each of said first rollers and having their peripheral faces spaced apart therefrom a predetermined distance, film guide means tangent to said first and said second rollers and arcuate guide means extending from said first film guide means and about said second rollers, and means for driving said drive rollers whereby the end of a leader secured to a film to be processed, said leader being thicker than said predetermined distance, may be inserted between one of said first free rollers and its cooperative drive roller, driven around said film guide means and may be drivingly engaged by the other of said first free rollers and its cooperative drive roller and said film will be pulled over said free rollers by said leader.

6. A method of propelling film through a series of pairs of rollers, each pair comprising a driving and a free roller, which consists of securing a leader to said film, said leader being substantially thicker than the film, spacing each pair of rollers relative to each other a distance greater than the thickness of said film and less than the thickness of said leader, and inserting the end of said leader between at least one pair of rollers in said series thereby causing said last rollers to drive said leader and consequently pull said film over the surfaces of at least some of said free rollers without contact with said driving rollers.

7. In film processing apparatus employing a cooperative drive and free roller, a leader substantially thicker than and attached to said film, the method of causing said rollers to distinguish between the leader and the film and only drive said leader, which consists of spacing the active and cooperative surfaces of said rollers a distance apart greater than the thickness of said film and less than the thickness of said leader, and inserting the end of said leader between said surfaces, thereby causing the leader only to be driven.

8. In apparatus for processing film having a substantially thicker leader of a predetermined length attached thereto, a first set of cooperative drive and free rollers, a second set of cooperative drive and free rollers spaced apart from said first set, the spacing between adjacent cooperative surfaces of said sets of rollers being greater than the thickness of said film and less than the thickness of said leader, whereby said leader only is adapted to be driven by said sets and said film is thereby pulled over the free rollers without contact with said drive rollers, and guide means for said leader and film between said first and said second sets of rollers, the length of said leader being such that as its leading end enters between the rollers in said second set its trailing end is leaving the rollers in said first set.

9. The invention according to claim 8 in which said guide means includes an additional free roller with a set of opposed parallel vertical V-shaped guides between it and said first sets of rollers, and an arcuate guide slightly spaced apart from the perimeter of at least a portion of said last mentioned free roller for guiding film from said set to a succeeding set of guides, said guide means and said last mentioned free roller being submerged at a fixed level in a tank of liquid employed in processing said film.

10. The invention according to claim 8 in which said guide means includes an additional free roller with a set of vertical opposed V-shaped guides between it and said first sets of rollers, and an arcuate guide slightly spaced apart from the perimeter of at least a portion of said last mentioned free roller, said guide means and said last mentioned free roller being submerged in a tank of liquid employed in processing said film, said last mentioned free roller being journalled on a shaft in bearing fixed in the lower portion of said tank and said guide means being rigidly supported in said tank.

11. The invention according to claim 8 characterized by the fact that said guide means is continuous between said first and said second sets of drive and free rollers and forms a tank for containing liquid employed in processing said film, said liquid being forced into the same at an intermediate point thereof.

12. In film processing apparatus, a system of rollers for conveying the film therethrough which includes driving and free rollers so positioned in fixed relation with respect to each other as to mutually contact and drive only a thick leader attached to the film, thereby pulling said film, which is thinner along over said free rollers.

13. In film processing apparatus for processing film to which a leader substantially thicker than the film is attached, a system of rollers for conveying the film therethrough which includes driving and free rollers and means to drive the former, the spacing between the adjacent surfaces of said driving rollers and said free rollers being less than the thickness of said leader and greater than the thickness of said film.

14. In self threading film processing apparatus for processing film to which a short leader substantially thicker than the film is attached, a system of rollers for conveying the film therethrough which includes cooperative driving and free rollers and means to drive the former, other free rollers spaced apart from said first mentioned rollers with guide means therebetween, other guide means at least partially embracing said last free rollers, the spacing between the adjacent surfaces of said driving rollers and said first mentioned free rollers being less than the thickness of said leader and greater than the thickness of said film, whereby when said leader is inserted between the first drive and free roller in the system it will be driven thereby, guided around one of said other free rollers and thence to a second cooperating drive and free roller, the process repeating as the leader advances through the apparatus, thereby pulling the film over the free rollers only.

15. In a device for processing film a series of free rollers flanked by drive rollers, said rollers being disposed in several groups and all said rollers being provided with rims formed of rubber or the like, film guide means defining paths between the free rollers in said groups, other arcuate film guide means individual to the free rollers in each group, the faces of said drive rollers, except the last one in the series, being spaced apart from its associated free roller a distance greater than the thickness of the film and a distance less than the thickness of a thick leader secured to said film, said last drive roller being spaced apart from its associated free roller a distance less than the thickness of the film, whereby said leader may be inserted between a drive roller and the free roller in the first of said groups to automatically thread the film through the array of rollers and guides, and when said leader passes from between said last drive roller and its associated free roller, the latter cooperate to drive the film and pull the same over all the other free rollers in said series.

VERNEUR E. PRATT.
GEORGE F. GRAY.

(References on following page)

REFERENCES CITED

The following references are of record in the file of this patent:

UNITED STATES PATENTS

| Number | Name | Date |
|---|---|---|
| 1,991,251 | Ingman | Feb. 12, 1935 |
| 2,111,759 | Douden | Mar. 22, 1938 |
| 2,342,394 | Fullerton | Feb. 22, 1944 |
| 939,350 | Thompson | Nov. 9, 1909 |
| 1,809,830 | Cobb | June 16, 1931 |
| 1,573,379 | Elmendorf | Feb. 16, 1926 |
| 1,670,873 | Avenson | May 22, 1928 |
| 1,919,926 | Bodan | July 25, 1933 |
| 1,656,522 | Joseph | Jan. 17, 1928 |
| 2,048,182 | Ybarrando | July 21, 1936 |
| 2,085,188 | Gerlach | June 29, 1937 |
| 757,323 | Lienekampf | Apr. 12, 1904 |
| 1,890,490 | Barkelew | Dec. 13, 1932 |
| 1,991,249 | Ingman et al. | Feb. 12, 1935 |

FOREIGN PATENTS

| Number | Country | Date |
|---|---|---|
| 529,933 | Germany | July 23, 1931 |
| 303,140 | Great Britain | Aug. 8, 1929 |
| 594,938 | Germany | Mar. 24, 1934 |